Dec. 4, 1923.
M. S. NEAL
1,475,961
TOOL HANDLE
Filed Aug. 31, 1921
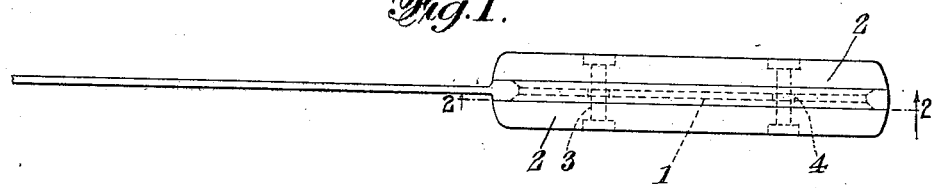
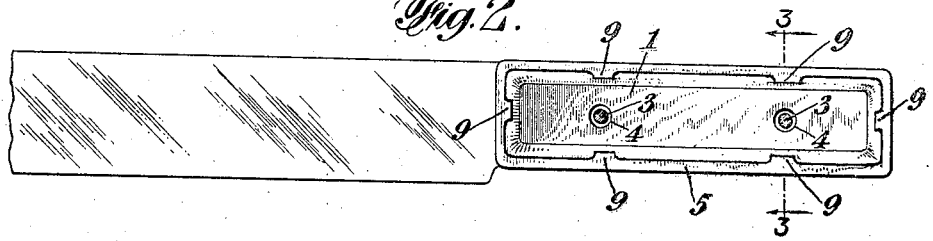
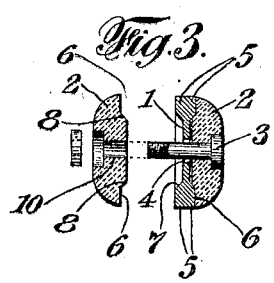
Morris Stanley Neal  Inventor
By his Attorneys
Prindle, Wright & Small Patented Dec. 4, 1923.

1,475,961

UNITED STATES PATENT OFFICE.

MORRIS STANLEY NEAL, OF COLLINSVILLE, CONNECTICUT.

TOOL HANDLE.

Application filed August 31, 1921. Serial No. 497,092.

*To all whom it may concern:*

Be it known that I, MORRIS STANLEY NEAL, a citizen of the United States, a resident of Collinsville, in the county of Hartford and State of Connecticut, have invented a certain new and useful Tool Handle, of which the following is a specification.

The invention has for an object to construct a tool handle, in which the material forming the gripping member of the handle will be fastened to the shank of the tool so securely as to minimize loosening or shifting between the above-mentioned elements.

Another object is to provide a handle wherein the grip portion may be readily adjusted to proper position on the tool shank, without requiring expensive fitting operations for individual handles of the same type, thus making the handles interchangeable in most instances, and permitting the same to be cheaply manufactured without sacrificing strength or accuracy of fit.

Further objects and advantages of the invention will be in part obvious and in part specifically pointed out in the description hereinafter contained, which, taken in connection with the accompanying drawings, discloses a preferred embodiment thereof; such embodiment, however, is to be considered merely as illustrative of its principle.

In the drawings:

Fig. 1 is a top view of a tool handle constructed in accordance with the invention.

Fig. 2 is a section on line 2—2 of Fig. 1.

Fig. 3 is a section on line 3—3 of Fig. 2, showing one of the grip portions spaced from the remainder of the handle.

The invention is illustrated as applied to a knife shank 1, of a butcher's knife for example, the gripping members 2, of horn, wood, rubber composition or other suitable material, being disposed on opposite sides of the shank 1, and being secured thereto by means of suitable binding members 3 seated in the gripping members 2 and passing through holes 4 in the shank.

The binding parts 3 may be considered as rivets, screws, or the like. If the engaging surfaces of the shank and gripping members be made flat and the pressure exerted by binding members 3 be relied upon to furnish the sole means for holding the elements of the handle in proper relation to each other, it ordinarily will be necessary to fit the binding members carefully with regard to the holes 4 in the shank and to align the holes in the gripping members 2 with the holes in the shank very accurately in order that when the parts of the handle are assembled the holes and edges of the gripping members will be co-extensive with those of the shank. Thus, each handle will have to be fitted more or less individually, requiring special drilling and fitting operations which involve considerable time and expense.

According to the present invention, the tool shank and the gripping members are provided with interlocking raised portions and depressions which position the gripping members properly when the latter are assembled with regard to the shank, and thus the binding member 3 need not be carefully positioned to insure that the parts are properly assembled, but need only be tightened up to bring about proper engagement between the above-mentioned raised portions and depressions.

In the present instance, the knife shank 1 is provided with raised portions 5, which extend around its edges on opposite sides, and which co-operate with depressions 6 in the adjacent surfaces of the gripping members 2. The raised portions may be formed on the shank 1 in any suitable manner, for instance, by drop-forging, and the depressions 6 ordinarily will be ground or buffed off of the gripping members by a wheel of suitable character.

As indicated in Fig. 3, I prefer to bevel the inner edges 7 of the raised portions 5 and also the sides 8 of the depressed portions in such manner that when the parts of the handle are assembled the gripping portions 2 will be wedged into position against the shank, and thus hold securely against loosening or shifting.

As is shown in Fig. 2, it is not necessary that the raised portions 5 engage the beveled sides 8 of the depressed portions throughout, but lugs 9 may be provided at intervals for this purpose, thus permitting special adjustments in size, if necessary, to be easily made by grinding or filing off the lugs until the gripping members seat firmly against the shank.

With a structure of the above character, the binding members 3 may be made materially smaller than the holes 4 in the shank, since the engagement of the binding members with the walls of the holes is not relied upon to prevent lateral shifting of the gripping members; thus the holes 10 in the gripping members, which receive the binding members, need not be accurately aligned with the hole 4, nor need the holes in the shank and gripping members be spaced apart an exact distance, and the size of hole 4 may be made large enough to insure that no special fitting operations, with regard to the holes, will be required for individual handles, even though the dimensions of the parts thereof may vary to some extent. The pressure employed in applying binding members 3 also usually will be sufficient to seat the gripping members 2 firmly against raised portions 5 of the shank, without necessitating any substantial amount of fitting for individual handles of a given type.

While a specific embodiment of the invention has been described, it is obvious that many changes may be made therein without departing from its principle, as defined in the following claims:

I claim:

1. A tool handle comprising a metallic shank member, a gripping member disposed at one side of said shank, one of said members having a raised portion at its side edges fitting into a depression adjacent the side edges of the other member, the inner portions of the adjacent surfaces of said members being spaced apart, and means for binding said members together.

2. A tool handle comprising a metallic shank member, gripping members disposed on opposite sides thereof, said parts being provided with interlocking raised portions and depressions, said shank member having a relatively large hole therethrough, and a smaller binding member extending through said hole to secure the gripping members to the shank member.

3. A tool handle comprising a metallic shank member, gripping members disposed on opposite sides thereof, said parts being provided with interlocking raised portions and depressions, said shank member having a relatively large hole therethrough, and a smaller binding member extending through said hole to secure the gripping members to the shank member, a substantial area of the adjacent surfaces of said members being spaced apart.

4. A tool handle comprising a metallic shank member having a raised portion on each side located at the edges thereof, gripping members disposed at opposite sides of said shank member and having depressions fitting against said raised portions, said shank member having a relatively large hole therethrough, and a smaller binding member extending through said hole to secure the gripping members to the shank member.

5. A tool handle comprising a metallic shank member having a raised portion on each side located at the edges thereof, gripping members disposed at opposite sides of said shank member and having depressions fitting against said raised portions, said shank member having a relatively large hole therethrough, and a smaller binding member extending through said hole to secure the gripping members to the shank member, the inner portions of the adjacent surfaces of said members being spaced apart.

6. A tool handle comprising a metallic shank member, a gripping member disposed at one side of said shank, one of said members having a depression on the side adjacent the other member, and said other member having a raised portion fitting into said depression to oppose lateral shifting between the members, said raised portion having a lug of relatively small dimensions engaging the other member, and means for binding the members together.

In testimony that I claim the foregoing, I have hereunto set my hand this 29th day of August, 1921.

MORRIS STANLEY NEAL.